United States Patent [19]

Traub

[11] 3,911,270

[45] Oct. 7, 1975

[54] LIGHT PEN READING

[75] Inventor: Alan C. Traub, Framingham, Mass.

[73] Assignee: Identicon Corporation, Franklin, Mass.

[22] Filed: Aug. 28, 1974

[21] Appl. No.: 501,360

[52] U.S. Cl. ................ 250/227; 250/216; 250/566; 250/569; 235/61.11 E

[51] Int. Cl.² ............................................ G01N 21/30

[58] Field of Search ........... 250/216, 227, 568, 569, 250/566, 239; 178/DIG. 2; 350/96 R, 96 B; 235/61.11 E

[56] References Cited

UNITED STATES PATENTS

| | | | |
|---|---|---|---|
| 3,497,701 | 2/1970 | Dalton | 250/216 |
| 3,809,893 | 5/1974 | Dobras | 250/568 |
| 3,868,514 | 2/1975 | Israelsson | 250/227 X |

OTHER PUBLICATIONS

Montedonico; IBM Technical Disclosure Bulletin; Vol. 11; No. 12; May 1969; pp. 1761, 1762.

*Primary Examiner*—Walter Stolwein
*Attorney, Agent, or Firm*—Charles Hieken; Jerry Cohen

[57] ABSTRACT

A hand-held light pen reader for reading bar-coded tickets and labels comprises a sleeve body with an open nose and a sapphire ball burnished into the nose, a solid state infrared or visible light emitting diode (LED) light source and solid state photodetector contained within the body, optical fibers encapsulated to form with the encapsulant a block structure and leading from the light source and detector and converging to a common point within the sleeve body aligned with the nose along an axis of the body, and a lens mounted from the sleeve body between the optical fibers and sapphire ball via elastic cushioning means.

8 Claims, 4 Drawing Figures

LIGHT PEN READING

BACKGROUND OF THE INVENTION

The present invention relates in general to label reading and more particularly concerns a novel light pen reader characterized by exceptional ruggedness, good sensitivity, a relatively broad range of acceptable tilt angles and relatively high resolution while being relatively easy and inexpensive to fabricate.

A typical pen reader, such as that used in a point-of-sale system, comprises a light source for illuminating a label to be scanned and a photodetector for converting the light reflected from the label being scanned into corresponding electrical impulses representative of the width of contiguous black and white bars for interpretation by apparatus remote from the light pen. With pen readers at each point of sale for frequent use by relatively unskilled personnel, there is a problem with damage to light pens which may be caused by careless use of the personnel, such as by dropping the pen.

Accordingly, it is an important object of the invention to provide an improved pen reader characterized by exceptional ruggedness while providing reliable readout, even when used by relatively unskilled personnel.

It is a further object of the invention to achieve the preceding object while providing relatively high sensitivity over a relatively broad range of tilt angles at which the reader is held while scanning a label.

It is a further object of the invention to achieve one or more of the preceding objects while providing relatively high resolution.

It is a further object of the invention to achieve one or more of the preceding objects with a pen reader that is relatively easy and economical to manufacture.

SUMMARY OF THE INVENTION

According to the invention, the novel pen reader comprises means defining an outer sleeve assembly having a stiff metallic front end formed with a burnished metal surface opening. The opening accommodates transparent sphere means which protrude therefrom for contact with the surface of a label to be scanned. There is a solid state light source electro-optical element mounted in a rear portion of the outer sleeve assembly for emitting light when energized with electrical energy. Photodetector means are also mounted in a rear portion of the outer sleeve for converting light energy reflected from a label being scanned through said transparent sphere means into a corresponding electrical signal. Fiber optic means extend from the light source means and the photodetector means toward the transparent sphere means to converge essentially at a point of convergence upon said axis for exchanging light source means and the photodetector means.

Means define an inner sleeve inside the outer sleeve assembly for accommodating the fiber optic means. An elastic matrix means surrounds the fiber optic means inside the inner sleeve for reducing the effects of shock and vibration upon the fiber optic means. Means define a substantially inelastic forward sleeve base containing the convergent forward ends of the fiber optic means.

Lens means are mounted within the outer sleeve body between the transparent sphere means and the inner sleeve base and secured to the outer sleeve body by resilient means, such as a resilient adhesive. The lens means focus light from the light source upon the outer surface of the transparent sphere means and focus the image substantially at the outer surface of the transparent sphere means upon the point of convergence for transmission to the photodetector means. Means define electrical conductors extending from the light source means and the photodetector means for exchange of electrical energy.

Other objects, features and advantages of the invention will be apparent from the following detailed description of preferred embodiments taken in connection with the accompanying drawing, in which:

DETAILED DESCRIPTION OF PREFERRED EMBODIMENTS

Figure 1:
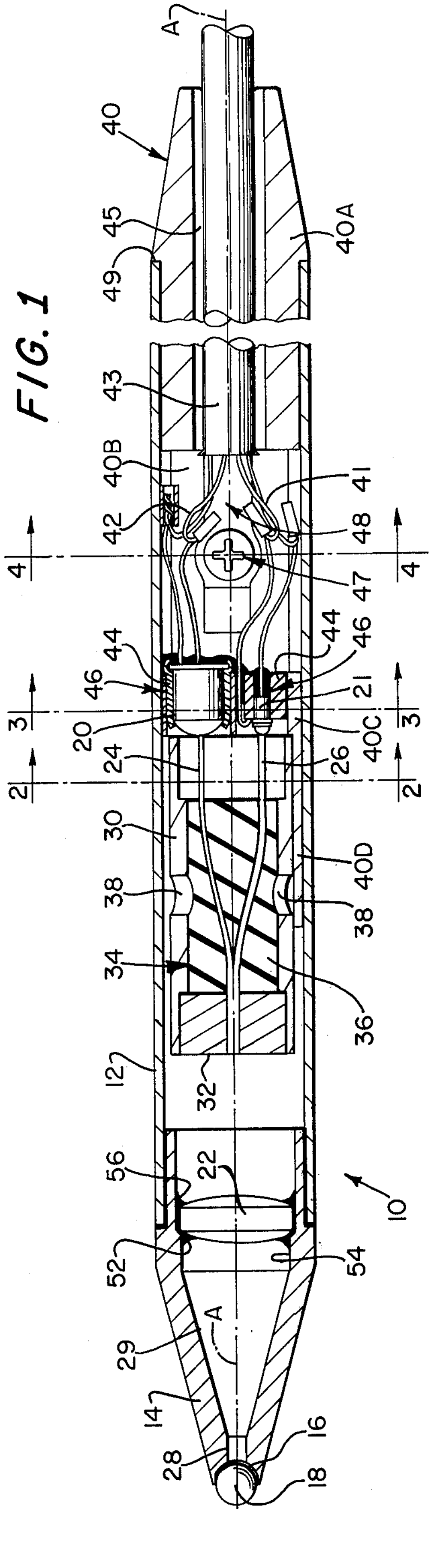
FIG. 1 is a longitudinal sectional view of a probe made in accordance with a preferred embodiment of the invention.

Referring now to the drawing, there is shown, in FIG. 1, a longitudinal sectional view of a light pen or probe 10 according to the invention comprising an outer sleeve body 12 having a longitudinal axis AA and terminating at its forward end in a conical forward tip 14 having a nose opening 16 on axis AA. A transparent ball 18 is geometrically locked in the opening 16. The ball is preferably made of sapphire and is press fitted into the opening 16 and retained there by spin forming, or by extruding the metal lip of the pen tip opening over the central zone of the ball, so as to hold it securely and prevent rotation of the ball.

An optical system is entirely mounted within the sleeve 12 and comprises an infrared or visible light emitting diode 20, a solid state infrared and visible light photodetector 21 and a lens 22, together with light channeling means. The light channeling means comprise optical fibers 24 and 26 for diode 20 and detector 21, respectively, converging from said elements toward each other and meeting at a point of convergence on the axis AA through lens 22 and the ball 18.

A cylindrical tunnel 28 of smaller diameter than sphere 18 is directly behind the nose opening 16. A conical transition section 29 flares out from tunnel 28 to blend into sleeve 12. The lens 22 is mounted at the junction of sleeve 12 and section 29. This configuration provides an effective view of data to be read by the probe over a wide range of tilt angles of the probe while preventing internal reflection within the probe.

The probe further comprises an inner sleeve body 30 rigidly mounted within the outer sleeve body 12 and coaxial therewith and comprising a base 32 and a cavity 34 which contains an elastic matrix 36 supporting the convergent optical fibers 24 and 26. A pair of holes 38 on opposite sides of the sleeve body 30 allow forced injection of elastic matrix material through one hole and escape of air through the other hole to thereby impregnate the cavity 34 with the elastic matrix material 36. Preferably, India ink or other dark colorant is first injected throughout a hole 30 to coat the optical fibers 24 and 26 to prevent stray light transmission between the fibers in the event that some fibers break. Then the sleeve body 30 is impregnated with an elastic matrix material, preferably a low viscosity silicone rubber compound such as Dow Corning's No. 734 RTV adhesive. The impregnation may be carried out by holding sleeve 30 horizontal, injecting the compound through a lower hole 38 and allowing air to escape through an upper hole 38 until the impregnation is complete. After injection the probe is turned vertical to prevent run-off of the injected material during its cure, typically 24 hours.

The probe further comprises a rear assembly 40 containing electrical conductors 41 and 42 for connecting the diode 20 and detector 21, respectively, to electrical circuitry (not shown) outside the probe. A sleeve 43 jackets the conductors as they pass out of the rear end of the probe through an opening 45.

Figure 4:
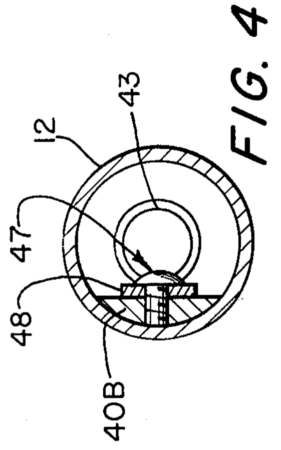
FIGS. 2–4 are cross-sectional views of the FIG. 1 embodiment taken as indicated by arrows 2—2, 3—3, 4—4, respectively.
Figure 3:
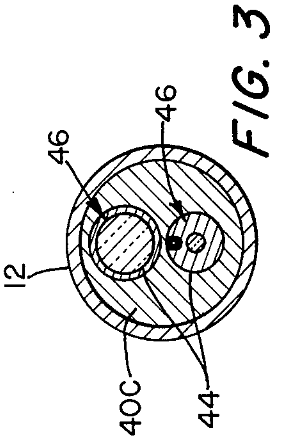
Figure 2:
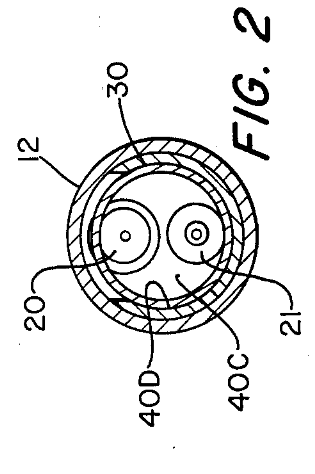

Rear assembly 40 comprises several portions which are further illustrated in the cross-sectional views of FIGS. 2–4, a first tubular portion 40A containing said opening 41, strip 40B, a central portion 40C for carrying the light source and photodetector in cannisters 44 in holes 46 and a forward portion 40D for carrying inner sleeve 30. Each of the portions of rear assembly 40 is rounded to fit snugly within outer sleeve 12. But portion 40D is not a complete circle; it extends for 200°–300° of circumference to engage inner sleeve 30 easily and with some spring action. Portion 40B extends for only about 90° of circumference to provide access for making electrical connections, for inserting cannisters 44 containing the light source and detector into holes 46 and for applying elastic temporary adhesive behind the inserted cannisters. A screw 47 secures the end of the outer metal ground sheath 48 of the connecting cable to portion 40B. This protects against the cable being pulled out of the pen or cable tension being transmitted to the connecting wires 41, 42.

The conical tip 14 and rear assembly 40 are fastened to the outer sleeve body 12 by temporary adhesive, i.e., adhesives which can be loosened without breaking the adhered parts such as waxy adhesives which can be softened by heating to allow disengagement of the adhered parts. The lens 22 is also demountably secured in the conical tip 14 by a temporary, but resilient, elastic adhesive, preferably RTV. Similarly, the lamp 20 and detector 21 are potted into place in cannisters 44 by temporary, but resilient, elastic adhesives.

Assembly of the probe comprises inserting the lamp and detector into cannisters 44 with leads extending therefrom, inserting cannisters 44 into holes 46 of portion 40C, applying adhesive to hold the cannisters 44 in holes 46 and to encapsulate the rear portions of the electro-optical components, inserting the cable through portion 40A, securing the ground sheath portion 48 of the cable by screw 47, connecting the leads to the conductors 41 and 42 via solderless connectors, inserting assembly 40 into sleeve body 12 until a shoulder 49 on portion 40A contacts the rear end of sleeve body 12.

The lens 22 is assembled into conical tip 14 by first applying a layer 52 of adhesive to a shoulder 54 thereof, laying in the lens 22 and allowing layer 52 to run around the outer edge of lens 22 and then applying a further annular bead 56 of adhesive and curing to form an elastic mount extending annularly around the edge of the lens 22. Then the conical tip 14 is assembled with the outer sleeve body 12.

The completed device exhibits high impact resistance including low vulnerability to breakage and low vulnerability to optical assembly misalignment. The sapphire ball 18 in the nose prevents entry into the probe of fibers from papers and thereby assures greater uniformity of operation over a long service life. The sapphire ball is more resistant to falling out of the present probe than it would be if mounted in conventional thermosetting plastic nose. It has been discovered that over the course of extended usage, the sapphire ball would induce cold flow in a plastic nose and this is avoided in the rigid metallic nose of the present invention.

The elastic adhesive provided at several points as described above, allows critical parts such as the lens 22 and the parts 24 and 26 to vibrate under impact conditions and then return to their original position without breakage or permanent change of position. This affords reliability of the device over the course of long term hard usage.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Light pen reading apparatus comprising, means defining an outer sleeve assembly having a stiff metallic front end terminating in a front metal surfaced opening, transparent sphere means mounted in said opening and protruding therefrom for engagement with a surface to be scanned, light source means mounted in a rear portion of the outer sleeve for emitting light in response to electrical energizing, photodetector means mounted in a rear portion of the outer sleeve for converting light reflected from said surface through said transparent sphere means into a corresponding electrical signal, electrical conductor means connected to said light source and photodetector means, first and second fiberoptic means extending forwardly from said light source means and said photodetector means, respectively, to a point of convergence essentially on the axis of said outer sleeve, and lens means resiliently mounted within said outer sleeve assembly between said opening and said inner sleeve base for focusing light from said point of convergence upon said surface and for focusing light reflected from said surface upon said point.

2. Light pen reading apparatus in accordance with claim 1 and further comprising, means defining an inner sleeve with an axis which is parallel to the outer sleeve axis, the inner sleeve being arranged within said outer sleeve assembly and containing said fiberoptic means, elastic matrix means within said inner sleeve surrounding said fiber optic means for reducing the effects of shock and vibration thereon, substantially inelastic forward sleeve base means containing the convergent forward ends of said fiberoptic means at the front of said inner sleeve.

3. Light pen reading apparatus in accordance with claim 2 and further comprising, means defining a further assembly which is insertable through said outer sleeve and which comprises a forward portion carrying said inner sleeve, a central portion carrying said light source and photodetector means and a rear portion carrying said conductor means, said rear portion constituting a rear end cap of the outer sleeve when said assembly is inserted.

4. Light pen reading apparatus in accordance with claim 2 wherein said inner sleeve is formed with opposed side wall openings therein for receiving material comprising said elastic matrix means and for expelling air displaced thereby.

5. Light pen reading apparatus in accordance with claim 1 and further comprising, means defining a cylindrical tunnel of smaller diameter than said sphere directly behind said sphere and a flared out section behind said tunnel flaring back to a lens opening accommodating said lens means of larger diameter than said sphere.

6. Light pen reading apparatus in accordance with claim 1 wherein said light source means and said photodetector means are mounted at substantially the same axial location within said outer sleeve assembly.

7. Light pen reading apparatus in accordance with claim 6 wherein said fiberoptic means are unconfined along length sections thereof between the elastic matrix means and said substantially the same axial location.

8. Light pen reading apparatus in accordance with claim 1 and further comprising, means defining a cable with a ground strip and additional conductors passing through said outer sleeve, means securing said ground strip to the outer sleeve, and means electrically connecting said additional conductors to the photodetector means and light source means.

* * * * *